United States Patent
Akhoury et al.

(10) Patent No.: US 12,238,391 B1
(45) Date of Patent: Feb. 25, 2025

(54) PRIVACY CONTROLS FOR WEB CONFERENCE SESSION

(71) Applicant: CITRIX SYSTEMS, INC., Fort Lauderdale, FL (US)

(72) Inventors: Arnav Akhoury, Jamshedpur (IN); Shruthi S, Bangalore (IN); Spurthi P, Bangalore (IN)

( * ) Notice: Subject to any disclaimer, the term of this patent is extended or adjusted under 35 U.S.C. 154(b) by 714 days.

(21) Appl. No.: 17/374,683

(22) Filed: Jul. 13, 2021

(51) Int. Cl.
- *H04N 21/8355* (2011.01)
- *G06N 20/00* (2019.01)
- *H04N 21/24* (2011.01)
- *H04N 21/442* (2011.01)

(52) U.S. Cl.
CPC ......... *H04N 21/8355* (2013.01); *G06N 20/00* (2019.01); *H04N 21/2407* (2013.01); *H04N 21/44218* (2013.01); *H04N 21/44236* (2013.01)

(58) Field of Classification Search
CPC .......... H04N 21/8355; H04N 21/2407; H04N 21/44218; H04N 21/44236; G06N 20/00
See application file for complete search history.

(56) References Cited

U.S. PATENT DOCUMENTS

| | | | | |
|---|---|---|---|---|
| 2009/0019367 | A1* | 1/2009 | Cavagnari | G06F 21/84 715/716 |
| 2016/0072862 | A1* | 3/2016 | Bader-Natal | H04N 7/15 715/755 |
| 2018/0109570 | A1* | 4/2018 | Kowal | H04L 65/403 |
| 2023/0066845 | A1* | 3/2023 | Nagar | G06Q 10/103 |

* cited by examiner

Primary Examiner — Abiy Getachew

(57) ABSTRACT

A method may include determining an absence of an authorized attendee and/or a presence of an unauthorized attendee at a first client device engaged in a web conference session with a second client device. Data from the first client device may also be analyzed to determine a presence of unauthorized content. Remedial actions may be performed in response to determining the absence of an authorized attendee, the presence of an unauthorized attendee, and/or the presence of the unauthorized content. The remedial actions may include terminating, at the first client device, the capture and/or uploading of audio and/or video data. The remedial actions may also include terminating, at the second client device, the downloading and/or display of data from the first client device. The remedial actions may further include terminating, at a web conference server, the sending of data from the first client device to the second client device.

20 Claims, 7 Drawing Sheets

PRIVACY CONTROLS FOR WEB CONFERENCE SESSION

TECHNICAL FIELD

The subject matter described herein relates generally to web conferencing and more specifically to privacy controls for a web conference session.

BACKGROUND

A web conferencing application may provide access to a virtual meeting room in which multiple users in different locations may engage in audio data and/or video communication. The web conferencing application may support a variety of online communication sessions between two or more web-connected devices including, for example, meetings, training events, lectures, presentations, and/or the like. In some cases, the web conferencing application may also provide various collaborative features such as real time content sharing and editing.

SUMMARY

Methods, systems, and articles of manufacture, including computer program products, are provided for privacy controls for a web conference session. In one aspect, there is provided a system including at least one data processor and at least one memory. The at least one memory may store instructions, which when executed by the at least one data processor, cause the at least one data processor to at least: determine an absence of an authorized attendee at a first client device engaged in a web conference session with a second client device; determine a presence of unauthorized content in a data from the first client device; and in response to determining the absence of the authorized attendee at the first client device and/or the presence of the unauthorized content in the data from the first client device, perform one or more remedial actions to terminate a dissemination of the data from the first client device.

In some variations, one or more of the features disclosed herein including the following features can optionally be included in any feasible combination. The at least one data processor may be further caused to at least: determine a presence of an unauthorized attendee at the first client device; and perform the one or more remedial actions further in response to determining the presence of the unauthorized attendee at the first client device.

In some variations, the at least one data processor may be further caused to at least: apply, to an audio data and/or a video data from the first client device, a machine learning model trained to perform a voice recognition and/or a facial recognition in order to determine the absence of the authorized attendee at the first client device.

In some variations, the data from the first client device may include a first text corresponding to a transcription of an audio data captured at the first client device and/or a second text included in a screen shared with the second client device.

In some variations, the at least one data processor may be further caused to at least: apply, to the first text and/or the second text, a machine learning model trained to perform a natural language processing in order to determine the presence of the unauthorized content.

In some variations, the data from the first client device may include one or more still images and/or videos depicting an activity.

In some variations, the at least one data processor may be further caused to at least: apply, to the one or more still images and/or videos, a machine learning model trained to perform human activity recognition (HAR) in order to determine the presence of the unauthorized content.

In some variations, the one or more remedial actions may include terminating, at the first client device, a capture of the data and/or an uploading of the data to a web conference server.

In some variations, the one or more remedial actions may include terminating, at the second client device, a downloading and/or a display of the data from the first client device.

In some variations, the one or more remedial actions may include terminating, at a web conference server, the sending of the data from the first client device to the second client device.

In another aspect, there is provided a method for privacy controls for a web conference session. The method may include: determining an absence of an authorized attendee at a first client device engaged in a web conference session with a second client device; determining a presence of unauthorized content in a data from the first client device; and in response to determining the absence of the authorized attendee at the first client device and/or the presence of the unauthorized content in the data from the first client device, performing one or more remedial actions to terminate a dissemination of the data from the first client device.

In some variations, one or more of the features disclosed herein including the following features can optionally be included in any feasible combination. The method may further include: determining a presence of an unauthorized attendee at the first client device; and performing the one or more remedial actions further in response to determining the presence of the unauthorized attendee at the first client device.

In some variations, the method may further include: applying, to an audio data and/or a video data from the first client device, a machine learning model trained to perform a voice recognition and/or a facial recognition in order to determine the absence of the authorized attendee at the first client device.

In some variations, the data from the first client device may include a first text corresponding to a transcription of an audio data captured at the first client device and/or a second text included in a screen shared with the second client device. The presence of the unauthorized content may be determined by applying, to the first text and/or the second text, a machine learning model trained to perform a natural language processing.

In some variations, the data from the first client device may include one or more still images and/or videos depicting an activity.

In some variations, the method may further include: applying, to the one or more still images and/or videos, a machine learning model trained to perform human activity recognition (HAR) in order to determine the presence of the unauthorized content.

In some variations, the one or more remedial actions may include terminating, at the first client device, a capture of the data and/or an uploading of the data to a web conference server.

In some variations, the one or more remedial actions may include terminating, at the second client device, a downloading and/or a display of the data from the first client device.

In some variations, the one or more remedial actions may include terminating, at a web conference server, the sending of the data from the first client device to the second client device.

In another aspect, there is provided a computer program product that includes a non-transitory computer readable medium. The non-transitory computer readable medium may store instructions that cause operations when executed by at least one data processor. The operations may include: determining an absence of an authorized attendee at a first client device engaged in a web conference session with a second client device; determining a presence of unauthorized content in a data from the first client device; and in response to determining the absence of the authorized attendee at the first client device and/or the presence of the unauthorized content in the data from the first client device, performing one or more remedial actions to terminate a dissemination of the data from the first client device.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to privacy controls for a web conferencing session, it should be readily understood that such features are not intended to be limiting. The claims that follow this disclosure are intended to define the scope of the protected subject matter.

DESCRIPTION OF DRAWINGS

When practical, like reference symbols in the various drawings indicate like elements.

DETAILED DESCRIPTION

Figure 1:
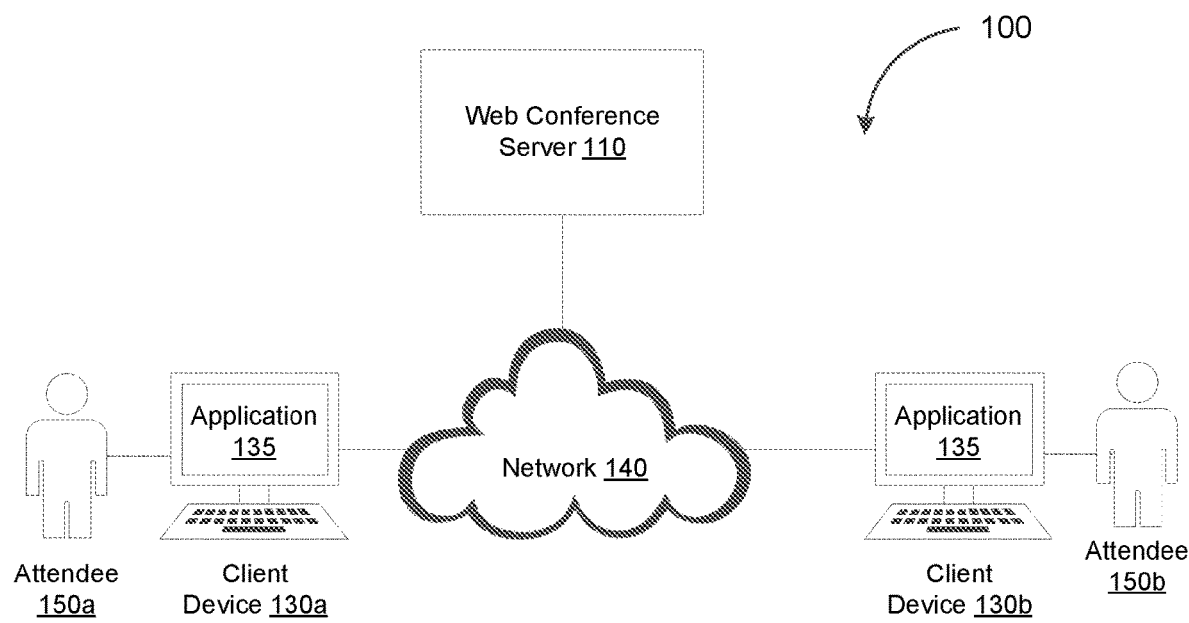
FIG. 1 depicts a system diagram illustrating an example of a web conferencing system, in accordance with some example embodiments.

When a first device of a first attendee and a second device of a second attendee are engaged in a web conference session, the first device and the second device may exchange data in real time (or near real time). This data may include audio data captured by a microphone, video data captured by a camera, and at least a portion of the content displayed at the first device and/or the second device. Although a web conference server may broker the exchange of data between the first device and the second device, data is nevertheless delivered to the first device and the second device over a real time communication channel with minimal latency. Under the current paradigm, when an attendee inadvertently or deliberately shares authorized content, neither the web conference server nor the web conference application at the device of that attendee exercise any controls over the dissemination of this data. Thus, the unauthorized content may be delivered unchecked to the devices of the other attendees.

In some example embodiments, a privacy controller may be configured to monitor the data that is exchanged during a web conference session and prevent the dissemination of unauthorized content. For example, the privacy controller may include one or more machine learning models trained to verify the presence of an authorized attendee and/or to detect the presence of unauthorized attendees. The one or more machine learning models may be trained to perform voice recognition to determine, based at least on an audio data captured at a device, whether one or more user at the device are authorized to attend the web conference session. Alternatively and/or additionally, the one or more machine learning models may be trained to perform facial recognition to determine, based at least on a video (or a still image) captured at the device, whether the authorized attendee is present. The privacy controller may terminate the capture, upload, download, dissemination, and/or display of data from the device if the output of the machine learning models indicates an absence of the authorized attendee and/or a presence of an unauthorized attendee.

In some example embodiments, the privacy controller may include one or more machine learning models trained to detect whether the data from a device engaged in a web conference session includes unauthorized content. For example, data from the device may include text that is included in a screen shared with the other devices engaged in the web conference session. Data from the device may also include text corresponding to a transcribing the speech that is captured at the device, for example, by a microphone. The one or more machine learning models may perform natural language processing (NLP) to determine a sentiment, a topic, and/or an intent associated with the text. Alternatively and/or additionally, data from the device may include still images and/or videos in which case the one or more machine learning models may perform human activity recognition (HAR) to determine the activity depicted in the still images and/or videos. The privacy controller may terminate the capture, upload, download, dissemination, and/or display of data from the device if the output of the machine learning models indicates the presence of unauthorized content, which may include confidential, offensive, and/or illicit content.

FIG. 1 depicts a system diagram illustrating an example of a web conferencing system 100, in accordance with some example embodiments. Referring to FIG. 1, the web conferencing system 100 may include a web conference server 110 that is communicatively coupled via a network 140 with one or more client devices 130 including, for example, a first client device 130a, a second client device 130b, and/or the like. The one or more client devices 130 may be processor-based devices including, for example, a smartphone, a personal computer, a tablet computer, a wearable apparatus, an Internet-of-Things (IoT) appliance, and/or the like. The network 140 may be a wired network and/or a wireless network including, for example, a local area network (LAN), a virtual local area network (VLAN), a wide area network (WAN), a public land mobile network (PLMN), the Internet, and/or the like.

A web conferencing application 135 at each of the one or more client devices 130 may be configured to provide access to a virtual meeting room in which multiple attendees, such as a first attendee 150a at the first client device 130a and a second attendee 150b at the second client device 130b, may engage in real time audio and/or video communication. In some cases, the web conferencing application 135 may be a cloud-based software application that is hosted at a central server, such as the web conference server 110, on one or more virtual machines. Alternatively and/or additionally, the web conferencing application 135 may be provided as part of a workspace in a virtual desktop, such as a high definition virtual desktop, in which case the functionalities of the web conferencing application 135 may be accessible during a virtual desktop session.

The first client device 130a and the second client device 130b may, as noted, engage in a real time exchange of data that includes, for example, audio data captured by a microphone and/or video data captured by a camera. In cases where the web conferencing application 135 supports a screen sharing functionality, the data exchanged between the first client device 130a and the second client device 130b may include at least a portion of the content displayed at one client device is shared with and displayed at other client device. Absent any content control, the data that is exchanged between the first client device 130a and the second client device 130b may include unauthorized content such as confidential, offensive, and/or illicit content.

Figure 2:
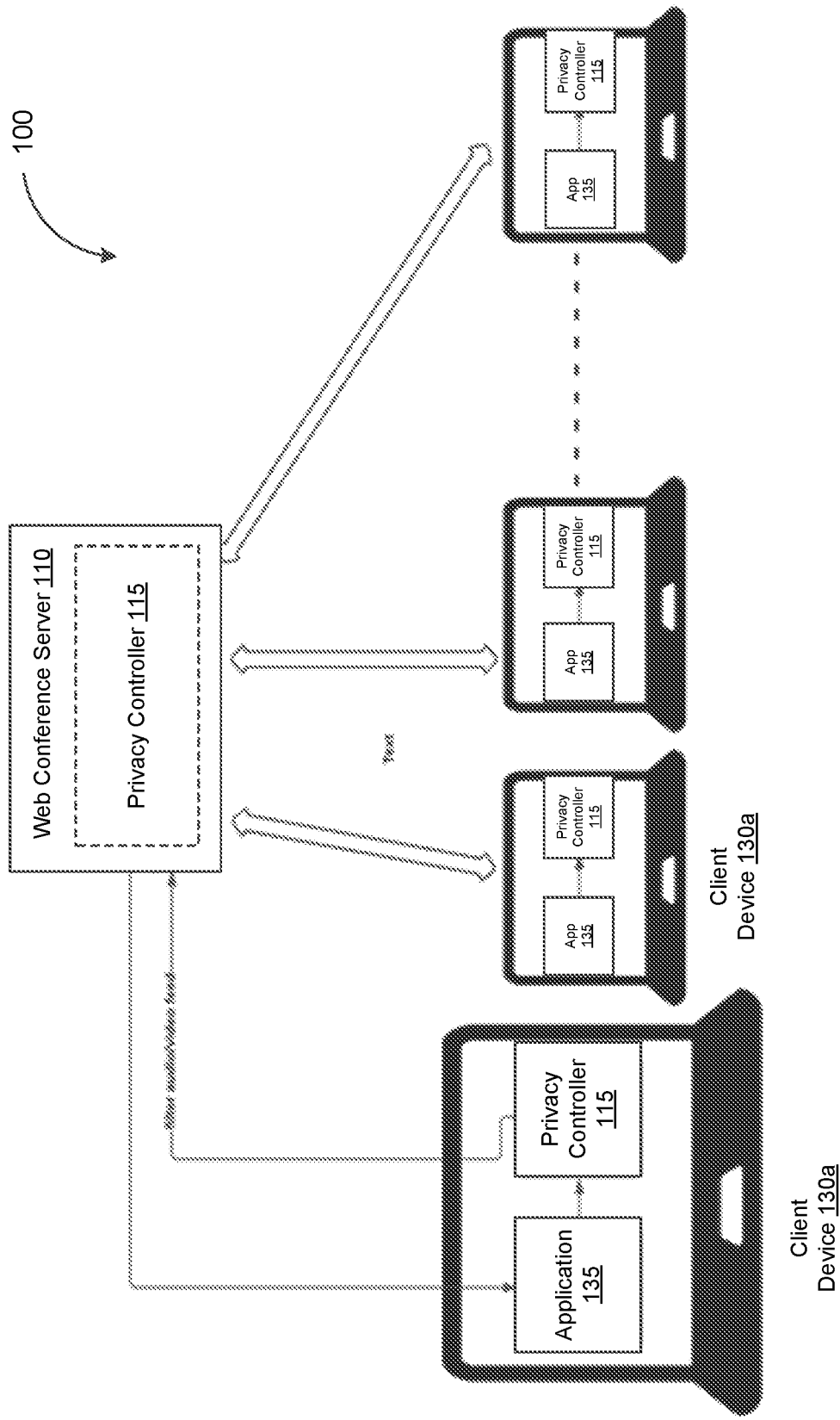
FIG. 2 depicts a schematic diagram illustrating another example of a web conferencing system, in accordance with some example embodiments.

FIG. 2 depicts a schematic diagram illustrating another example of the web conferencing system 100, in accordance with some example embodiments. As shown in FIG. 2, a privacy controller 115 may be deployed at the web conference server 110, the first client device 130a, and/or the second client device 130b. In some example embodiments, the privacy controller 115 may be configured to monitor the data that is exchanged during the web conference session between the first client device 130a and the second client device 130b and prevent the dissemination of unauthorized content. In the example of the web conferencing system 100 shown in FIG. 2, the functionalities of the privacy controller 115 may be distributed between the web conference server 110, the first client device 130a, and/or the second client device 130b. For example, functionalities that require less computational resources, such as lightweight text or image processing, may be performed at the first client 130a and/or the second client 130b whereas functionalities that require more computational resources, such as the training of machine learning models, may be performed at the web conference server 110. Moreover, in some example embodiments, the functionalities of the privacy controller 115 may be activated (or deactivated) based on one or more user inputs. For instance, one or more functionalities of the privacy controller 115 may be enabled (or disabled) in response to corresponding commands received at the first client device 130a (e.g., from the first attendee 150a) and/or the second client device 130b (e.g., from the second attendee 150b).

Figure 3:
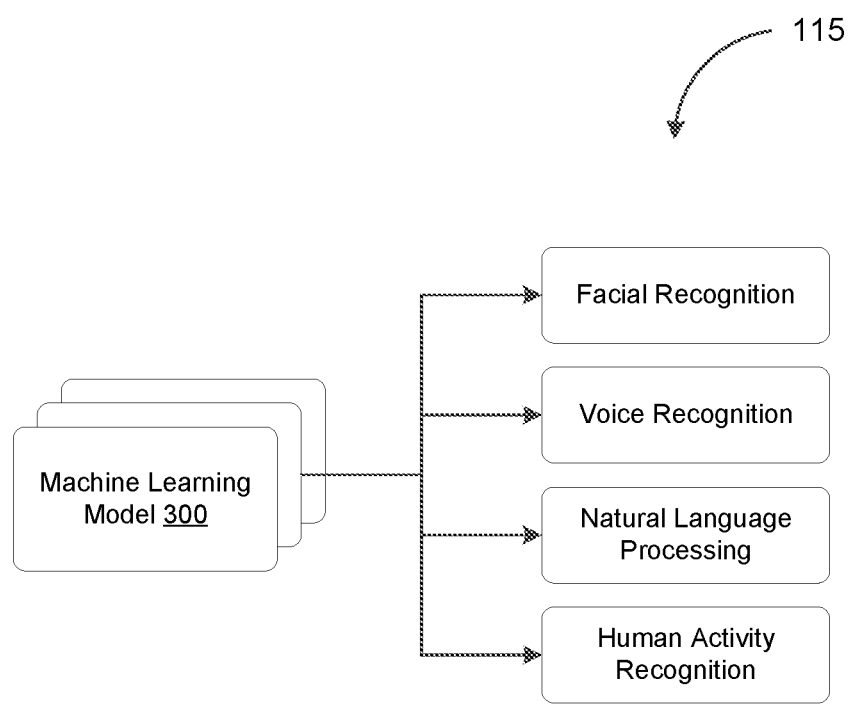
FIG. 3 depicts a block diagram illustrating an example of a privacy controller, in accordance with some example embodiments.

In some example embodiments, the privacy controller 115 may include one or more machine learning models 300 configured to analyze the data exchanged during the web conference session and detect the presence of unauthorized content. FIG. 3 depicts a block diagram illustrating an example of the privacy controller 115, in accordance with some example embodiments. As shown in FIG. 3, to detect the presence of unauthorized content, the one or more machine learning models 300 may be trained to perform a variety of cognitive tasks including, for example, facial recognition, voice recognition, natural language processing (NLP), human activity recognition (HAR), and/or the like. The one or more machine learning models 300 may include a variety of machine learning models including, for example, a convolutional neural network (CNN), a recurrent neural network (RNN), a hidden Markov model, a conditional random field (CRF) model, a gated recurrent unit (GRU), a Bayesian network, a decision tree, a regression model, an instance-based model, a regularization model, a clustering model, an associative model, a dimensionality reduction model, an ensemble model, and/or the like.

In some example embodiments, the one or more machine learning models 300 may be trained to verify the presence of an authorized attendee and/or to detect the presence of unauthorized attendees. For example, the one or more machine learning models 300 may be trained to perform voice recognition to determine, based at least on an audio data captured at the first client device 130a, whether the first attendee 150a at the first client device 130a is authorized to attend the web conference session. Alternatively and/or additionally, the one or more machine learning models 300 may be trained to perform facial recognition to determine, based at least on a video (or a still image) captured at the first client device 130a, whether the first attendee 150a, who is an authorized attendee, is present at the first client device 130a.

The privacy controller 115 may perform, based at least the absence of an authorized attendee and/or the presence of an unauthorized attendee at the first client device 130a, one or more remedial actions. For example, if the output of the one or more machine learning models 300 indicates the absence of an unauthorized attendee and/or the presence of an unauthorized attendee at the first client device 130a, the privacy controller 115 may terminate, at the first client device 130a, the capture and/or upload of audio data and/or video data to the web conference server 110. The first client device 130a may be excluded from the web conference session, for example, by the privacy controller 115 terminating the connection with the first client device 130. Other examples of remedial actions may include the privacy controller 115 terminating, at the web conference server 110, the dissemination of audio data and/or video data from the first client device 130a. For instance, the web conference server 110 may cease sending, to the second client device 130b engaged in the web conference session with the first client device 130a, audio data and/or video data originating from the first client device 130a. Alternatively and/or additionally, the remedial actions may include the privacy controller 115 terminating, at the second client device 130b, the download and/or display of audio data and/or video data from the first client device 130a. In some cases, a notification may be provided, for example, at the first client device 130a, the second client device 130b, and/or a third client device of an administrator, of the remedial actions being taken in response to the absence of an authorized attendee and/or the presence of an unauthorized attendee at the first client device 130a.

In some example embodiments, the one or more machine learning models 300 may be trained to detect whether the data from the first client device 130a includes unauthorized content. For example, data from the first client device 130a may include text that is displayed at the first client device 130a and shared with the other devices engaged in the web conference session such as the second client device 130b. Data from the first client device 130a may also include text transcribing the speech that is captured at the first client device 130a, for example, by a microphone (or another audio sensor). As such, the one or more machine learning models 300 may perform natural language processing (NLP) to determine a sentiment, a topic, and/or an intent associated with the text.

Alternatively and/or additionally, data from the device may include still images and/or videos captured at the first client device 130, for example, by a camera (or another image sensor). Accordingly, the one or more machine learning models 300 may perform human activity recognition (HAR) to determine the activity depicted in the still images and/or videos. For example, the one or more machine learning models 300 may classify the still images and/or videos into categories corresponding to the type of activity depicted in the still images and/or videos. Still images and/or videos depicting some categories of activities, such as sitting, note taking, and drinking, may constitute authorized content whereas still images and/or videos depicting other categories of activities, including explicit or illicit actions, may constitute unauthorized content.

In some example embodiments, the performance of the one or more machine learning models 300 may be optimized by training the one or more machine learning models 300 using a variety of handcrafted motion features, each of which being a skeleton sequence depicting the position of a human subject performing a type of activity. Alternatively and/or additionally, the performance of the one or more machine learning models 300 may be optimized by including depth information associated with the still images and/or videos. Depth information (or other 3-dimensional structural information) from depth sensors, such as range images from a range camera in which each pixel includes values corresponding to a distance, may be used to extract the position and postures of the objects depicted in the still images and/or videos with greater precision and accuracy. Examples of depth sensing techniques include stereo triangulation, sheet of light triangulation, structured light, time-of-flight, interferometry, and coded aperture.

The privacy controller 115 may perform one or more remedial actions in the event the output of the one or more machine learning models 300 indicates the presence of unauthorized content in the audio data and/or video data from the first client device 130a. In one example embodiment, the privacy controller 115 may terminate, at the first client device 130a, the capture and/or upload of audio data and/or video data. The first client device 130a may also be excluded from the web conference session, for example, by the privacy controller 115 terminating the connection with the first client device 130. Other examples of remedial actions may include the privacy controller 115 terminating, at the web conference server 110, the dissemination of audio data and/or video data from the first client device 130a. For example, the web conference server 110 may cease sending, to the second client device 130b engaged in the web conference session with the first client device 130a, audio data and/or video data originating from the first client device 130a. Alternatively and/or additionally, the remedial actions may include the privacy controller 115 terminating, at the second client device 130b, the download and/or display of audio data and/or video data from the first client device 130a. In some cases, a notification may be provided, for example, at the first client device 130a, the second client device 130b, and/or a third client device of an administrator, of the remedial actions being taken in response to the presence of unauthorized content in the audio data and/or video data from the first client device 130a.

Figure 4:
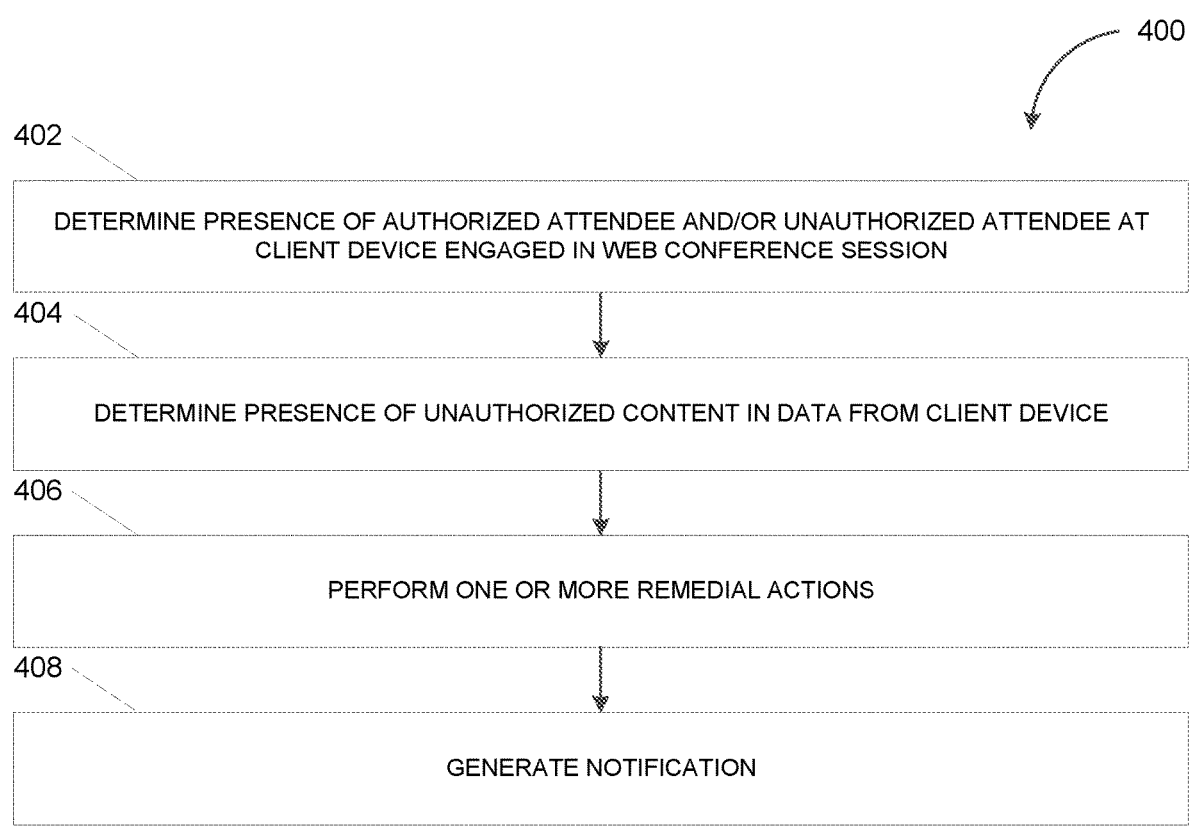
FIG. 4 depicts a flowchart illustrating an example of a process for privacy control during a web conference session, in accordance with some example embodiments.

FIG. 4 depicts a flowchart illustrating an example of a process 400 for privacy control during a web conference session, in accordance with some example embodiments. Referring to FIGS. 1-4, the process 400 may be performed by the privacy controller 115 to control the exchange of audio data and/or video data during a web conference session including the first client device 130a and the second client device 130b. As noted, the functionalities of the privacy controller 115 may be distributed across the web conference server 110, the first client device 130a, and the second client device 130b.

At 402, the privacy controller 115 may determine the presence of an authorized attendee and/or an unauthorized attendee at a client device engaged in web conference session. In some example embodiments, the privacy controller 115 may include the one or more machine learning models 300 trained to perform a voice recognition and/or a facial recognition to determine whether the first attendee 150a at the first client device 130a is an authorized attendee or an unauthorized attendee. As noted, one or more remedial actions may be performed in response to the output of the one or more machine learning models 300 indicating an absence of an authorized attendee and/or a presence of an unauthorized attendee at the first client device 130a.

At 404, the privacy controller 115 may determine the presence of unauthorized content in data from the client device. For example, in some example embodiments, the one or more machine learning models 300 may perform natural language processing (NLP) and/or human activity recognition (HAR) in order to determine whether the audio data and/or the video data from the first client device 130a includes unauthorized content such as confidential, offensive, and/or illicit content.

At 406, the privacy controller 115 may perform one or more remedial actions. In some example embodiments, the privacy controller 115 may perform one or more remedial actions in response to the output of the one or more machine learning models 300 indicating an absence of an authorized attendee at the first client device 130a, a presence of an unauthorized attendee at the first client device 130a, and/or a presence of an unauthorized content in the data from the first client device 130a. For example, the privacy controller 115 may terminate, at the first client device 130a, the capture and/or upload of audio data and/or video data. The first client device 130*a* may also be excluded from the web conference session, for example, by the privacy controller 115 terminating the connection with the first client device 130. Other examples of remedial actions may include the privacy controller 115 terminating, at the web conference server 110, the dissemination of audio data and/or video data from the first client device 130*a*. Alternatively and/or additionally, the remedial actions may include the privacy controller 115 terminating, at the second client device 130*b*, the download and/or display of audio data and/or video data from the first client device 130*a*.

At 408, the privacy controller 115 may generate a notification. For example, the privacy controller 115 may send, to the first client device 130*a*, the second client device 130*b*, and/or a third client device of an administrator, a notification of the remedial actions being taken in response to the absence of an authorized attendee at the first client device 130*a*, the presence of an unauthorized attendee at the first client device 130*a*, and/or the presence of unauthorized content in the audio data and/or video data from the first client device 130*a*.

Figure 5A:
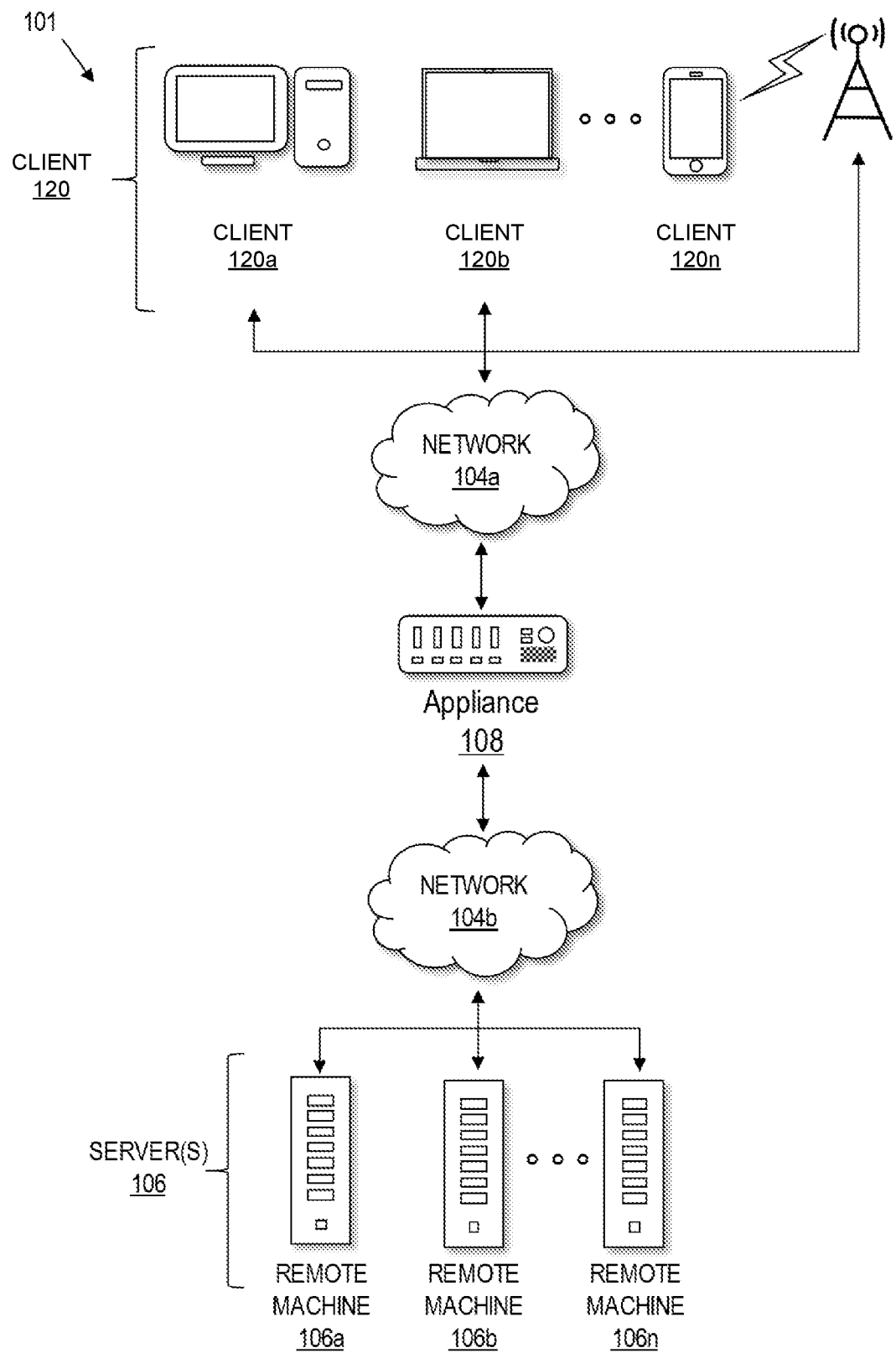
FIG. 5A depicts a network diagram illustrating an example of a network environment, in accordance with some example embodiments.

FIG. 5A depicts a network diagram illustrating an example of a network environment 101, in accordance with some example embodiments. Referring to FIGS. 1-4 and 5A, the network environment 101 in which various aspects of the disclosure may be implemented may include one or more clients 120*a*-120*n*, one or more remote machines 106*a*-106*n*, one or more networks 104*a* and 104*b*, and one or more appliances 108 installed within the network environment 101. The clients 120*a*-120*n* communicate with the remote machines 106*a*-106*n* via the networks 104*a* and 104*b*.

In some example embodiments, the clients 120*a*-120*n* may communicate with the remote machines 106*a*-106*n* via an appliance 108. The illustrated appliance 108 is positioned between the networks 104*a* and 104*b*, and may also be referred to as a network interface or gateway. In some example embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. In some example embodiments, multiple appliances 108 may be used, and the appliance(s) 108 may be deployed as part of the network 104*a* and/or 104*b*.

The clients 120*a*-120*n* may be generally referred to as client machines, local machines, clients, client nodes, client computers, client devices, computing devices, endpoints, or endpoint nodes. One or more of the clients 120*a*-120*n* may implement, for example, the first client device 130*a*, the second client device 130*b*, the third client device 130*c*, and/or the like. The remote machines 106*a*-106*n* may be generally referred to as servers or a server farm. In some example embodiments, a client 120 may have the capacity to function as both a client node seeking access to resources provided by a server 106 and as a server 106 providing access to hosted resources for other clients 120*a*-120*n*. The networks 104*a* and 104*b* may be generally referred to as a network 104. The network 104 including the networks 104*a* and 104*b* may be configured in any combination of wired and wireless networks.

The servers 106 may include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality. The servers 106 may include, for example, the resource controller 115 and/or the like.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

In some example embodiments, a server 106 may execute a remote presentation services program or other program that uses a thin-client or a remote-display protocol to capture display output generated by an application executing on a server 106 and transmit the application display output to a client 120.

In yet other example embodiments, a server 106 may execute a virtual machine, such as the first virtual machine 125*a* and/or the second virtual machine 125*b*, to provide, for example, to the user 150 at the client device 130, access to a computing environment such as the application 135. The virtual machine may be managed by, for example, a hypervisor (e.g., the first hypervisor 165*a*, the second hypervisor 165*b*, and/or the like), a virtual machine manager (VMM), or any other hardware virtualization technique within the server 106.

In some example embodiments, the network 104 may be a local-area network (LAN), a metropolitan area network (MAN), a wide area network (WAN), a primary public network, and/or a primary private network. Additional embodiments may include one or more mobile telephone networks that use various protocols to communicate among mobile devices. For short-range communications within a wireless local-area network (WLAN), the protocols may include 802.11, Bluetooth, and Near Field Communication (NFC).

Figure 5B:
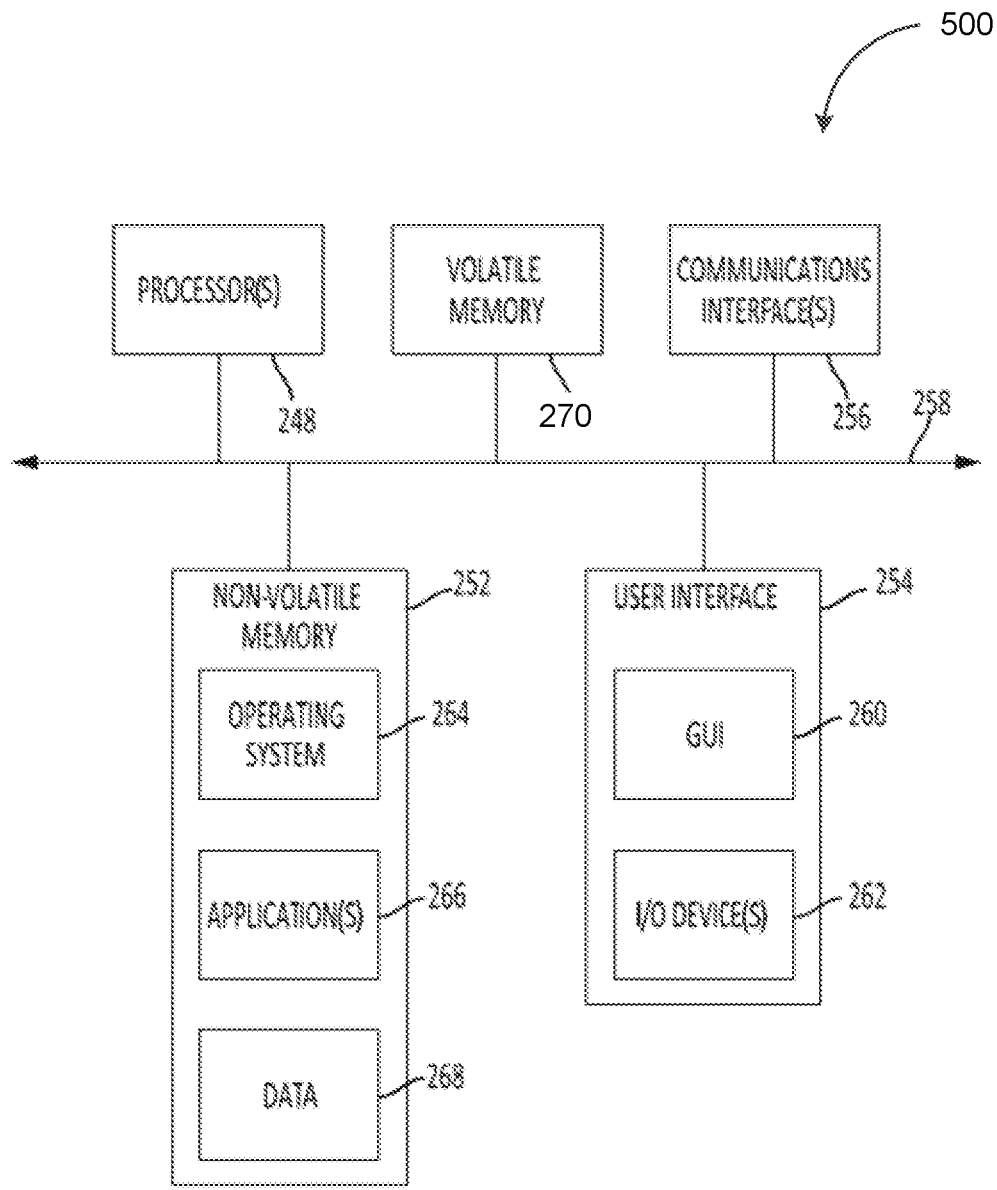
FIG. 5B depicts a block diagram illustrating an example of a computing device, in accordance with some example embodiments.

FIG. 5B depicts a block diagram illustrating an example of a computing device 500, in accordance with some example embodiments. Referring to FIGS. 1-4 and 5A-B, the computing device 500 may be useful for practicing an embodiment of the migration controller 110 and the client device 130.

As shown in FIG. 5B, the computing device 500 may include one or more processors 248, volatile memory 270 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, and/or the like) and one or more input/output (I/O) devices 262 (e.g., a mouse, a keyboard, and/or the like). The non-volatile memory 252 may store an operating system 264, one or more applications 266, and data 268 such that computer instructions of the operating system 264 and/or applications 266 are executed by the processor(s) 248 out of the volatile memory 270. Data may be entered using an input device of the GUI 260 or received from I/O device(s) 262. Various elements of the computing device 500 may communicate via communication the communication bus 258. The computing device 500 as shown in FIG. 5B is shown merely as an example, as the migration controller 110 and the client device 130 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some example embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some example embodiments, the "processor" may be one or more physical processors or one or more "virtual" (e.g., remotely located or "cloud") processors.

The communications interfaces 256 may include one or more interfaces to enable the computing device 500 to access a computer network such as a local area network (LAN), a wide area network (WAN), a public land mobile network (PLMN), and/or the Internet through a variety of wired and/or wireless or cellular connections.

As noted above, in some example embodiments, one or more computing devices 500 may execute an application on behalf of a user of a client computing device (e.g., the clients 120), may execute a virtual machine, which provides an execution session within which applications execute on behalf of a user or a client computing device (e.g., the clients 120), such as a hosted desktop session (e.g., associated with the application 135), may execute a terminal services session to provide a hosted desktop environment, or may provide access to a computing environment including one or more of: one or more applications, one or more desktop applications, and one or more desktop sessions in which one or more applications may execute.

Figure 5C:
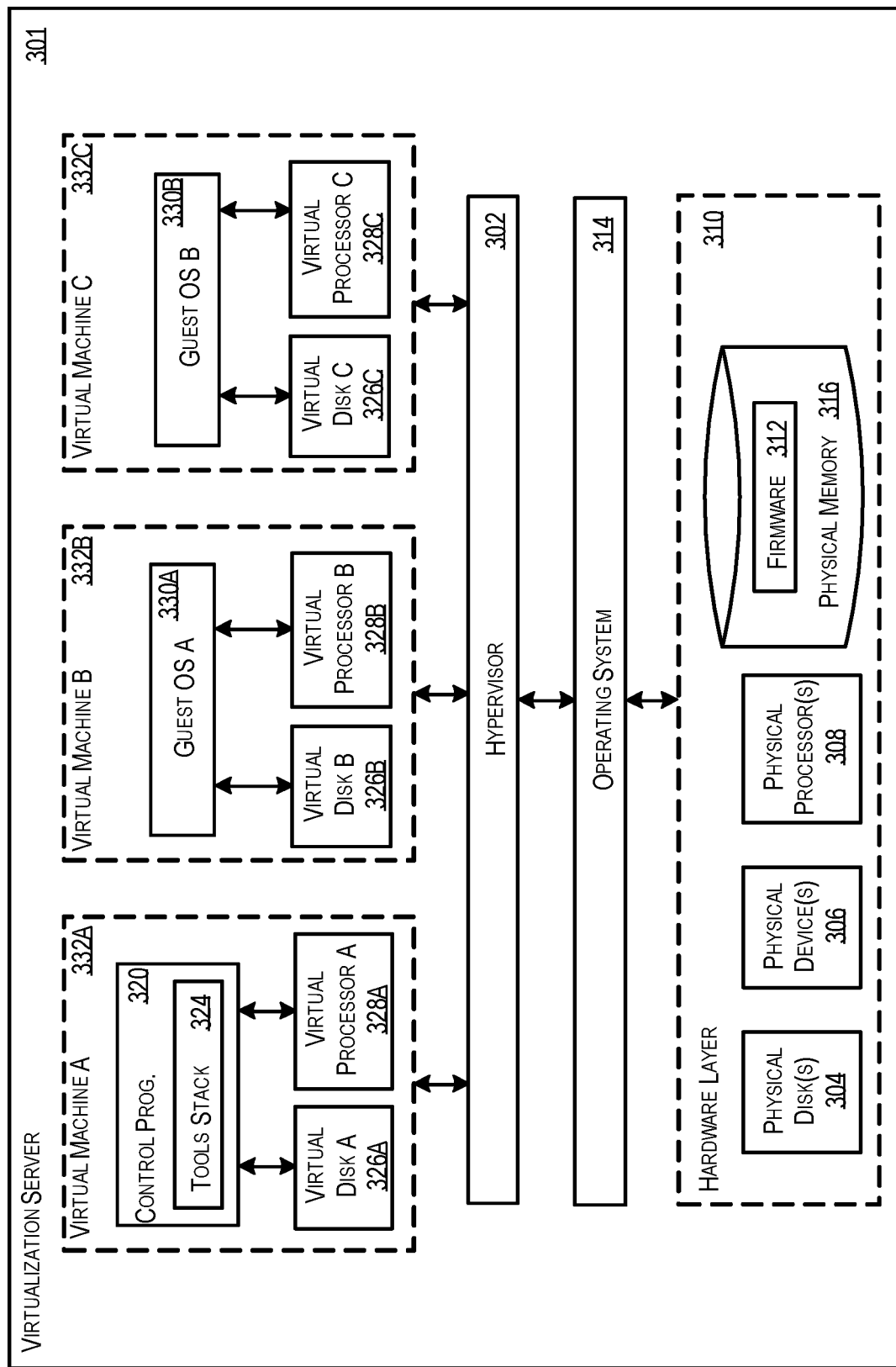
FIG. 5C depicts a high-level architecture of an example of a virtualization system for implementing a computing system, in accordance with some example embodiments.

FIG. 5C depicts a high-level architecture of an example of a virtualization system for implementing the computing system 110, in accordance with some example embodiments. As shown in FIG. 5C, the virtualization system may be a single-server or multi-server system, or a cloud system, including at least one virtualization server 301 configured to provide virtual desktops and/or virtual applications to one or more client access devices 120a-c. A desktop (or a virtual desktop) may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Virtualization server 301 may be configured as a virtualization server in a virtualization environment, for example, a single-server, multi-server, or cloud computing environment. Virtualization server 301 illustrated in FIG. 5C may be deployed as and/or implemented by one or more embodiments of server 106 illustrated in FIG. 5A or by other known computing devices. Included in virtualization server 301 is hardware layer 310 that may include one or more physical disks 304, one or more physical devices 306, one or more physical processors 308, and one or more physical memories 316. In some embodiments, firmware 312 may be stored within a memory element in physical memory 316 and be executed by one or more of physical processors 308. Virtualization server 301 may further include operating system 314 that may be stored in a memory element in physical memory 316 and executed by one or more of physical processors 308. Still further, hypervisor 302 may be stored in a memory element in physical memory 316 and be executed by one or more of physical processors 308. Presence of operating system 314 may be optional such as in a case where the hypervisor 302 is a Type A hypervisor.

Executing on one or more of physical processors 308 may be one or more virtual machines 332A-C(generally 332). Each virtual machine 332 may have virtual disk 326A-C and virtual processor 328A-C. In some embodiments, first virtual machine 332A may execute, using virtual processor 328A, control program 320 that includes tools stack 324. Control program 320 may be referred to as a control virtual machine, Domain 0, Dom0, or other virtual machine used for system administration and/or control. In some embodiments, one or more virtual machines 332B-C may execute, using virtual processor 328B-C, guest operating system 330A-B (generally 330).

Physical devices 306 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 310 may include any type of memory. Physical memory 316 may store data, and in some embodiments may store one or more programs, or set of executable instructions. FIG. 5C illustrates an embodiment where firmware 312 is stored within physical memory 316 of virtualization server 301. Programs or executable instructions stored in physical memory 316 may be executed by the one or more processors 308 of virtualization server 301.

Virtualization server 301 may also include hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 may be any combination of executable instructions and hardware that monitors virtual machines 332 executing on a computing machine. Hypervisor 302 may be a Type 2 hypervisor, where the hypervisor executes within operating system 314 executing on virtualization server 301. Virtual machines may then execute at a layer above hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within hardware layer 310. That is, while Type 2 hypervisor 302 accesses system resources through host operating system 314, as shown, a Type 1 hypervisor may directly access all system resources without host operating system 314. A Type 1 hypervisor may execute directly on one or more physical processors 308 of virtualization server 301, and may include program data stored in physical memory 316.

Hypervisor 302, in some embodiments, may provide virtual resources to guest operating systems 330 or control programs 320 executing on virtual machines 332 in any manner that simulates operating systems 330 or control programs 320 having direct access to system resources. System resources can include, but are not limited to, physical devices 306, physical disks 304, physical processors 308, physical memory 316, and any other component included in hardware layer 310 of virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for virtual machine 332 executing on virtualization server 301. Examples of hypervisor 302 may include those manufactured by VMWare, Inc., of Palo Alto, California; Xen Project® hypervisor, an open source product whose development is overseen by the open source XenProject.org community; Hyper-V®, Virtual Server®, and Virtual PC® hypervisors provided by Microsoft Corporation of Redmond, Washington; or others. The virtualization server 301 may execute hypervisor 302 that creates a virtual machine platform on which guest operating systems 330 may execute. When this is the case, virtualization server 301 may be referred to as a host server. An example of such a virtualization server is Citrix Hypervisor® provided by Citrix Systems, Inc., of Fort Lauderdale, Florida.

Hypervisor 302 may create one or more virtual machines 332B-C(generally 332) in which guest operating systems 330 execute. In some embodiments, hypervisor 302 may load a virtual machine image to create virtual machine 332. The virtual machine image may refer to a collection of data, states, instructions, etc. that make up an instance of a virtual machine. In other embodiments, hypervisor 302 may execute guest operating system 330 within virtual machine 332. In still other embodiments, virtual machine 332 may execute guest operating system 330.

In addition to creating virtual machines 332, hypervisor 302 may control the execution of at least one virtual machine 332. The hypervisor 302 may present at least one virtual machine 332 with an abstraction of at least one hardware resource provided by virtualization server 301 (e.g., any hardware resource available within hardware layer 310). In some implementations, hypervisor 302 may control the manner in which virtual machines 332 access physical processors 308 available in virtualization server 301. Controlling access to physical processors 308 may include determining whether virtual machine 332 should have access to processor 308, and how physical processor capabilities are presented to virtual machine 332.

As shown in FIG. 5C, the virtualization server 301 may host or execute one or more virtual machines 332. Virtual machine 332 may be a set of executable instructions and/or user data that, when executed by processor 308, may imitate the operation of a physical computer such that virtual machine 332 can execute programs and processes much like a physical computing device. While FIG. 5C illustrates an embodiment where virtualization server 301 hosts three virtual machines 332, in other embodiments virtualization server 301 may host any number of virtual machines 332. Hypervisor 302 may provide each virtual machine 332 with a unique virtual view of the physical hardware, including memory 316, processor 308, and other system resources 304, 306 available to that virtual machine 332. The unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to virtual machines 332.

Each virtual machine 332 may include virtual disk 326A-C(generally 326) and virtual processor 328A-C(generally 328.) Virtual disk 326 may be a virtualized view of one or more physical disks 304 of virtualization server 301, or a portion of one or more physical disks 304 of virtualization server 301. The virtualized view of physical disks 304 may be generated, provided, and managed by hypervisor 302. In some embodiments, hypervisor 302 may provide each virtual machine 332 with a unique view of physical disks 304. These particular virtual disk 326 (included in each virtual machine 332) may be unique, when compared with other virtual disks 326.

Virtual processor 328 may be a virtualized view of one or more physical processors 308 of virtualization server 301. The virtualized view of physical processors 308 may be generated, provided, and managed by hypervisor 302. Virtual processor 328 may have substantially all of the same characteristics of at least one physical processor 308. Virtual processor 308 may provide a modified view of physical processors 308 such that at least some of the characteristics of virtual processor 328 are different from the characteristics of the corresponding physical processor 308.

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
    at least one data processor; and
    at least one memory storing instructions, which when executed by the least one data processor, cause the at least one data processor to perform steps comprising:
        determining an absence of an authorized attendee at a first client device engaged in a web conference session with a second client device;
        determining a presence of unauthorized content in a data from the first client device; and
        in response to determining the absence of the authorized attendee at the first client device and/or the presence of the unauthorized content in the data from the first client device, preforming one or more remedial actions to terminate a dissemination of the data from the first client device;
        wherein determining the presence of unauthorized content comprises analyzing, by applying a machine learning model trained to perform human action recognition and natural language processing to detect unauthorized actions and/or unauthorized speech of one or more attendees of the web conference session.

2. The system of claim 1, wherein the at least one data processor is further caused to determine a presence of an unauthorized attendee at the first client device; and
    perform the one or more remedial actions further in response to determining the presence of the unauthorized attendee at the first client device.

3. The system of claim 1, wherein the at least one data processor is further caused to at least:
    apply, to an audio data and/or a video data from the first client device, a machine learning model trained to perform a voice recognition and/or a facial recognition in order to determine the absence of the authorized attendee at the first client device.

4. The system of claim 1, wherein the data from the first client device includes a first text corresponding to a transcription of an audio data captured at the first client device and/or a second text included in a screen shared with the second client device.

5. The system of claim 4, wherein the at least one data processor is further caused to at least:
    apply, to the first text and/or the second text, a machine learning model trained to perform a natural language processing in order to determine the presence of the unauthorized content.

6. The system of claim 1, wherein the data from the first client device includes one or more still images and/or videos depicting an activity.

7. The system of claim 6, wherein the at least one data processor is further caused to at least:
    apply, to the one or more still images and/or videos, a machine learning model trained to perform human activity recognition (HAR) in order to determine the presence of the unauthorized content.

8. The system of claim 1, wherein the one or more remedial actions include terminating, at the first client device, a capture of the data and/or an uploading of the data to a web conference server.

9. The system of claim 1, wherein the one or more remedial actions include terminating, at the second client device, a downloading and/or a display of the data from the first client device.

10. The system of claim 1, wherein the one or more remedial actions include terminating, at a web conference server, the sending of the data from the first client device to the second client device.

11. A computer-implemented method, comprising:
    determining an absence of an authorized attendee at a first client device engaged in a web conference session with a second client device;
    determining a presence of unauthorized content in a data from the first client device; and
    in response to determining the absence of the authorized attendee at the first client device and/or the presence of the unauthorized content in the data from the first client device, performing one or more remedial actions to terminate a dissemination of the data from the first client device;

wherein determining the presence of unauthorized content comprises analyzing, by the first client device applying a machine learning model trained to perform human action recognition and natural language processing to detect unauthorized actions and/or unauthorized speech of one or more attendees of the web conference session.

12. The method of claim 11, further comprising:
determining a presence of an unauthorized attendee at the first client device; and
performing the one or more remedial actions further in response to determining the presence of the unauthorized attendee at the first client device.

13. The method of claim 11, further comprising:
applying, to an audio data and/or a video data from the first client device, a machine learning model trained to perform a voice recognition and/or a facial recognition in order to determine the absence of the authorized attendee at the first client device.

14. The method of claim 11, wherein the data from the first client
device includes a first text corresponding to a transcription of an audio data captured at the first client device and/or a second text included in a screen shared with the second client device, and wherein the presence of the unauthorized content is determined by applying, to the first text and/or the second text, a machine learning model trained to perform a natural language processing.

15. The method of claim 11, wherein the data from the first client device includes one or more still images and/or videos depicting an activity.

16. The method of claim 15, further comprising:
applying, to the one or more still images and/or videos, a machine learning model trained to perform human activity recognition (HAR) in order to determine the presence of the unauthorized content.

17. The method of claim 11, wherein the one or more remedial actions include terminating, at the first client device, a capture of the data and/or an uploading of the data to a web conference server.

18. The method of claim 11, wherein the one or more remedial actions include terminating, at the second client device, a downloading and/or a display of the data from the first client device.

19. The method of claim 11, wherein the one or more remedial actions include terminating, at a web conference server, the sending of the data from the first client device to the second client device.

20. A non-transitory computer readable medium storing instructions, which when executed by at least one data processor, result in operations comprising:
determining an absence of an authorized attendee at a first client device engaged in a web conference session with a second client device;
step-means for determining a presence of unauthorized content in a data from the first client device; and
in response to determining the absence of the authorized attendee at the first client device and/or the presence of the unauthorized content in the data from the first client device, performing one or more remedial actions to terminate a dissemination of the data from the first client device;
wherein determining the presence of unauthorized content comprises analyzing, by applying a machine learning model trained to perform human action recognition and natural language processing to detect unauthorized actions and/or unauthorized speech of one or more attendees of the web conference session.

* * * * *